No. 815,979. PATENTED MAR. 27, 1906.
F. H. RICHARDS.
MECHANICAL MOVEMENT.
APPLICATION FILED APR. 25, 1900. RENEWED JUNE 23, 1903.

2 SHEETS—SHEET 1.

Witnesses:

Inventor:

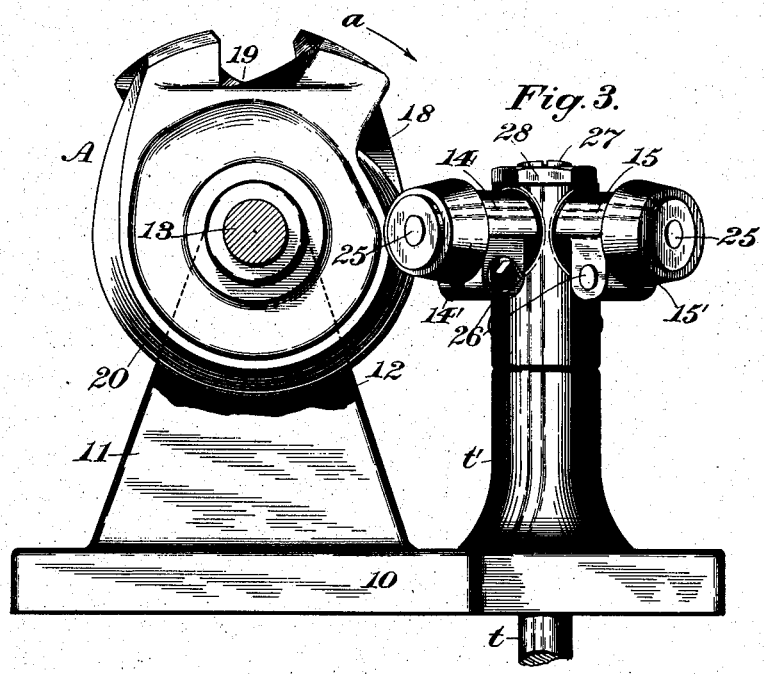
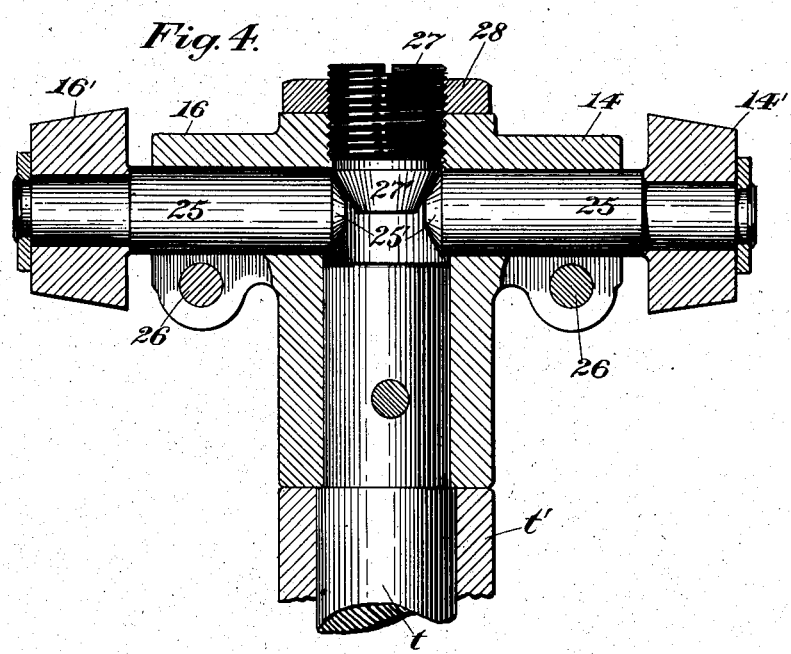

UNITED STATES PATENT OFFICE.

FRANCIS H. RICHARDS, OF HARTFORD, CONNECTICUT.

MECHANICAL MOVEMENT.

No. 815,979. Specification of Letters Patent. Patented March 27, 1906.

Application filed April 25, 1900. Renewed June 23, 1903. Serial No. 162,782.

*To all whom it may concern:*

Be it known that I, FRANCIS H. RICHARDS, a citizen of the United States, residing at Hartford, in the county of Hartford and State of Connecticut, have invented certain new and useful Improvements in Mechanical Movements, of which the following is a specification.

This invention relates to mechanical movements; and it has for its object the provision of an improved device whereby a continuous rotary movement of a driving member is converted into a variable or intermittent rotary movement of a driven member, the present invention being in the nature of an improvement upon the "Mechanism for converting motion," for which Letters Patent No. 297,165 were granted to me on April 22, 1884, to which reference may be had.

My invention includes as one of its features a rotary driving member or actuator in constant engagement with the driven member of the device for alternately imparting rotary movement thereto and locking the same against movement.

The driving member is preferably a mutilated spiral gear having one or more threads or grooves, the walls of which are adapted for engagement with the driven member. This latter has a series of arms to be successively operated upon in such a manner that only one arm will be in engagement with the actuator during the motive period of the driven member, while at other times the driven member will be locked against rotation by reason of the engagement of adjacent arms with a pair of stop-faces provided for that purpose on the actuator. There will, moreover, never be more than two arms of the driven member in use at any one time, while said stop-faces are effective reciprocally with said groove-walls of the actuator, which constitute the working faces of the device.

Figure 1:
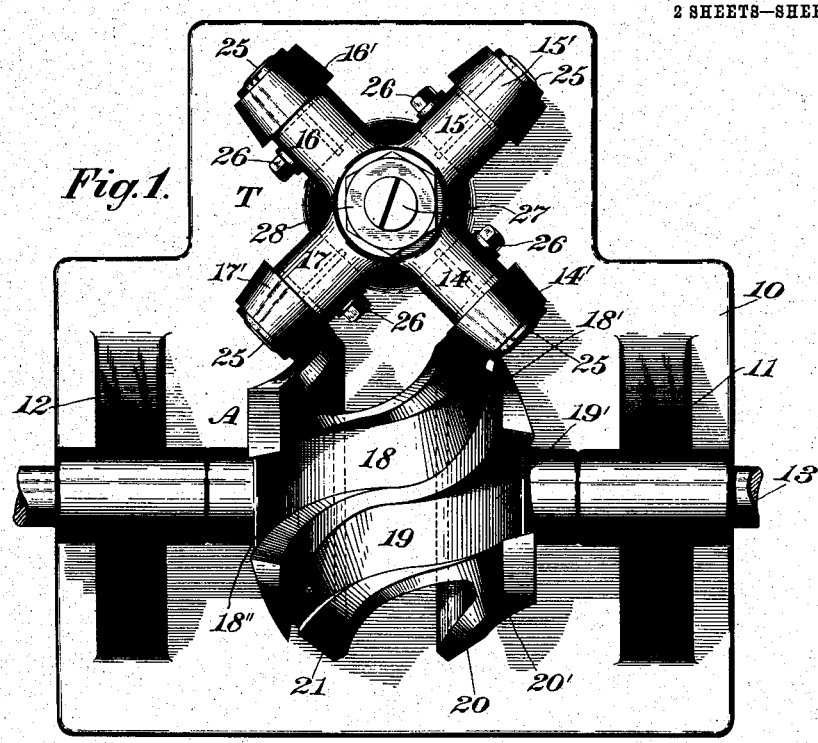
Figure 2:
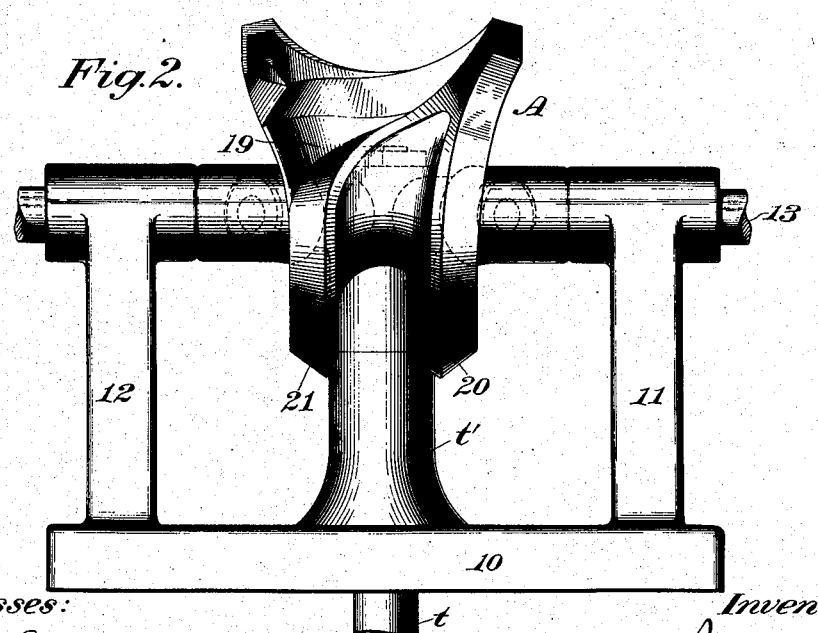

In the drawings accompanying this specification, Figure 1 is a top view of my improved mechanism. Fig. 2 is a front view; Fig. 3, a side view of the same, and Fig. 4 is a central vertical section of the driven member.

The mechanism illustrated in the drawings embodies a base-plate 10, having uprights 11 and 12, which constitute bearings for a driving member having a shaft 13, to which the actuator (designated in a general way by A) is secured. Continuous rotary movement may be imparted to the shaft 13 by any suitable means. (Not shown.)

The other or driven member of the mechanism is shown as a roller-turret, such as T, mounted on a shaft $t$, which is journaled in a bearing $t'$, and said turret has a series of equidistantly-disposed arms 14, 15, 16, and 17, carrying antifriction-rollers 14', 15', 16', and 17', respectively, which are adapted to be successively engaged by the actuator A.

The designed ratio of movement in the present instance is such that one rotation of the actuator will produce a half-rotation of the driven member or turret T. In order to effect this result, the actuator is provided with successive grooves 18 and 19, the walls of the former of which will when the actuator is rotated in the direction of the arrow $a$, Fig. 3, engage one of the rollers, such as the roller 14, and thus cause the turret T to be rotated until said roller is about to pass out of the rear end 18" of said groove, whereupon the front end 19' of the groove 19 will eagage the succeeding roller 15', which has in the meantime been brought into proper position by the rotation of the turret T.

When the roller 15' is about to pass out of the rear end of the groove 19, the front end 20' of the stop-face 20 approaches the next succeeding roller 16' and serves to check the movement of the turret, and since the actuating-wall of the groove 19 merges into a stop-face 21 by the time that the roller 15' has finally passed out of this groove the turret will have been locked against rotation in both directions by said stop-faces 20 and 21, as both faces now coöperate with the respective rollers 15' and 16' and effect the temporary locking of the turret. This locked condition of the driven member continues until the groove-walls again operate to actuate the driven member in a manner similar to that described above.

The speed that the turret will have during its period of movement relative to that of the actuator depends, of course, on the contour or pitch of the side walls of the grooves 18 and 19, and it will therefore be readily understood that an accelerated or a retarded movement of the turret may be obtained at any particular point of its movement by the employment of a properly-shaped groove.

It will also be understood that if only one groove should be used the resultant ratio of movement of the actuator and the turret would be four rotations of the former to one rotation of the latter and that if three grooves were used each rotation of the actuator would produce three-fourths of a rotation of the turret.

It is immaterial how many arms the turret has, provided that the proper operation of the device is not interfered with—in other words, that the driven member is so controlled by the actuator as to have two of its adjacent arms engaged by the latter when the driven member is approaching or leaving its idle period and when at rest, while but one roller is engaged substantially throughout its period of movement.

As it is frequently of great importance that the driven member or turret shall be absolutely under the control of the actuating member without the existence of looseness or back play, means are provided whereby a close contact between said members is assured, this result being attained by forming the antifriction-rollers slightly tapering, as clearly shown in Fig. 1, and mounting said rollers on studs that are radially adjustable, so that when said studs are forced radially outward a close contact between each roller-face and the actuator will result.

The preferred construction of the means for effecting an adjustment of all of the rollers simultaneously is clearly shown in Fig. 4 of the drawings, in which the rollers are shown journaled on studs 25, held in position in their respective arms by clamping-screws 26 and having at their inner ends conical portions, such as 25', in engagement with the correspondingly-shaped end 27' of a "backing" or adjusting screw 27, the latter being threaded into the turret and held in its adjusted position by a check-nut 28. It will therefore be seen that when said screw is forced inward all of the studs 25' will be simultaneously moved outward, whereupon they may be secured in such positions by the clamping-screws 26, above mentioned, the adjusting means just described forming the subject-matter of Letters Patent of the United States No. 366,189, granted to me July 5, 1887.

Having described my invention, I claim—

1. The combination, with a driven member movable at varying velocities and having a series of arms, of a driving member having a plurality of successively-effective arm-engaging working faces, and also having arm-engaging stop-faces effective alternately with said working faces.

2. The combination, with a driven member movable at varying velocities and having a series of arms, of a driving member having a plurality of successively-effective arm-engaging working faces, and also having arm-engaging stop-faces effective reciprocally with said working faces.

3. The combination, with a driven member movable at varying velocities and having a series of more than two arms, of a driving member having a pair of successively-effective working faces for engaging, respectively, a pair of arms to rotate said driven member through a predetermined arc, and then one of said arms for rotating said member through a further predetermined arc.

4. The combination, with a driven member movable at varying velocities and having a series of arms, of a driving member having a pair of successively-effective working faces for engaging, respectively, a pair of arms to rotate said driven member through a predetermined arc, and also having a pair of arm-engaging stop-faces for engaging a pair of arms and reciprocally effective with said working faces.

5. The combination, with a driven member movable at varying velocities and having a series of arms, of a driving member having a pair of successively-effective working faces for engaging, respectively, a pair of adjacent arms to rotate said driven member through a predetermined arc, and also having a pair of arm-engaging stop-faces for engaging a pair of adjacent arms and reciprocally effective with said working faces.

6. The combination, with a driven member movable at varying velocities and having a series of arms, of a driving member having a working face for engaging one of said arms to rotate said driven member through a predetermined arc, and also having a stop-face for engaging another arm, said arms being engaged at opposite sides by said faces when approaching the idle period of the driven member for controlling the movement of the latter.

7. The combination, with a driven member movable at varying velocities and having a series of arms, of a driving member having a spiral working face for engaging one of said arms to rotate said driven member through a predetermined arc, and also having a stop-face for engaging another arm, said arms being engaged at opposite sides by said faces when approaching the idle period of the driven member for controlling the movement of the latter.

8. The combination, with a driven member movable at varying velocities and having a series of arms, of a driving member having parallel spiral working faces for engaging said arms to rotate said driven member through a predetermined arc, and also having a stop-face for engaging another arm, said arms being engaged at opposite sides by said faces when approaching the idle period of the driven member for controlling the movement of the latter.

9. The combination, with a driven member movable at varying velocities and having a series of arms, of a driving member having grooves adapted for engaging said arms to actuate said driven member during its movement period and having a pair of stop-faces formed by continuations of the walls of said grooves and adapted for engaging a pair of adjacent arms of said driven member during its idle period.

10. The combination, with a driven member movable at varying velocities and having a series of arms, of a driving member having parallel peripheral grooves adapted for engaging said arms to actuate said driven member during its movement period, and having a pair of stop-faces formed by continuations of the walls of said grooves and adapted for engaging a pair of adjacent arms of said driven member during its idle period.

11. The combination, with a driven member movable at varying velocities and having a series of arms, of a driving member having a pair of spiral grooves adapted for engaging said arms to actuate said driven member during its movement period, and having a pair of parallel peripheral stop-faces formed by continuations of the walls of said grooves and adapted for engaging a pair of adjacent arms of said driven member during its idle period.

12. The combination with a driven member having a plurality of arms, of a rotatable driving member having a pair of spirally-arranged working faces adapted to engage one of said arms and also having stop-faces at opposite ends of said working faces adapted to engage with a plurality of said arms during the inoperative period of the working face.

13. A device for converting continuous into intermittent motion, the same comprising in combination, a driven member having a series of reaction-faces, and a driver having a working face with which alternately one and then a pair of said reaction-faces engage and which working face for at least a portion of its length is inclined to the direction of motion of the reaction-face.

14. A device for converting continuous into intermittent motion, the same comprising in combination, a driven member having a series of reaction-faces, and a driver having a working face with which alternately one and two of said reaction-faces engages and which working face has portions extending in different directions with reference to the direction of motion of the reaction-face.

15. A device for converting continuous into intermittent motion, the same comprising in combination, a driven member having oppositely-facing reaction-faces, and a driver having opposed working faces with which one and two of said reaction-faces alternately engage, and each of which working faces has only a portion of its length inclined to the direction of motion of the reaction-faces.

16. A device for converting continuous into intermittent motion, the same comprising in combination, a driven member having oppositely-facing reaction-faces, and a driver having opposed working faces with which said reaction-faces engage and each of which working faces has at least a portion of its length inclined to the direction of motion of the reaction-faces, one of said working faces terminating at one end in a locking-face and the other said working face terminating in a locking-face at the relatively opposite end.

17. A device for converting continuous into intermittent motion, the same comprising in combination, a rotary driven member having a plurality of arms, and a rotary driver having a helical groove whose side walls constitute working faces coöperative first with one arm and then with another, said driver also having opposed locking-faces coöperative with a pair of arms upon the disengagement of an arm from said groove.

18. A device for converting continuous into intermittent motion, the same comprising in combination, a rotary driven member having a plurality of arms, and a rotary driver having a helical groove whose side walls constitute working faces coöperative first with one arm and then with another, said driver also having opposed locking-faces extending around the driver in its plane of rotation and coöperative with a pair of arms upon the disengagement of an arm from said groove.

19. A device for converting continuous into intermittent motion, the same comprising in combination, a rotary driven member having a plurality of arms, and a rotary driver having a helical groove whose side walls constitute working faces coöperative first with one arm and then with another, said driver also having opposed locking-faces extending around the driver in its plane of rotation and coöperative with a pair of arms upon the disengagement of an arm from said groove, and one of the locking-faces at one point extending axially to thereby shift the driven member and bring the next following arm into said groove.

20. A device for converting continuous into intermittent motion, the same comprising in combination a rotary driven member having a plurality of arms, and a rotary driver having a plurality of helical grooves whose side walls constitute working faces coöperative those of one groove after those of another with consecutive arms, said driver also having opposed locking-faces coöperative with a pair of arms upon the disengagement of an arm from the last groove of the plurality thereof.

21. The combination with a driven member movable at varying velocities and having more than two arms, of a driving member having a pair of successively-effective working faces for engaging respectively two consecutive arms to rotate said driven member through a predetermined arc, and a working face for engaging one of said arms for moving the same through a further portion of said arc.

22. The combination with a driven member movable at varying velocities and having more than two arms, of a driving member having a plurality of successively-effective working faces for engaging respectively consecutive arms to rotate said driven member through a predetermined arc, and other faces for engaging another arm of said series for moving said member through a further predetermined arc.

FRANCIS H. RICHARDS.

Witnesses:
CHAS. F. SCHMELZ,
E. A. WEED.